F. W. TAYLOR, DEC'D.
E. W. CLARK, 3D, EXECUTOR.
BED FOR GROWING GRASS AND OTHER VEGETATION.
APPLICATION FILED JAN. 4, 1912.

1,171,559.

Patented Feb. 15, 1916.

UNITED STATES PATENT OFFICE.

FREDERICK W. TAYLOR, OF PHILADELPHIA, PENNSYLVANIA; EDWARD W. CLARK, 3D, EXECUTOR OF SAID TAYLOR, DECEASED.

BED FOR GROWING GRASS AND OTHER VEGETATION.

1,171,559.  Specification of Letters Patent.  Patented Feb. 15, 1916.

Application filed January 4, 1912. Serial No. 669,317.

*To all whom it may concern:*

Be it known that I, FREDERICK W. TAYLOR, a citizen of the United States of America, residing in Philadelphia, county of Philadelphia, in the State of Pennsylvania, have invented a certain new and useful Improvement in Beds for Growing Grass and other Vegetation, of which the following is a true and exact description, reference being had to the accompanying drawings, which form a part thereof.

My present invention consists in a bed for growing grass and other vegetation characterized by certain features of construction and arrangement employed on the one hand to facilitate and cheapen the cost of construction of the bed, and on the other hand to insure suitable root growing spaces extending to a considerable depth below the surface of the bed, with adequate supplies of air and root food available to the roots growing therein whereby a deep growth of roots is encouraged, and to give the bed as a whole a large capacity for absorbing moisture supplied from time to time, either naturally or artificially and to hold the moisture so absorbed available to the growing roots during relatively long period intervening between the times at which water is supplied to the bed.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described two forms in which my invention may be embodied.

Figure 1:
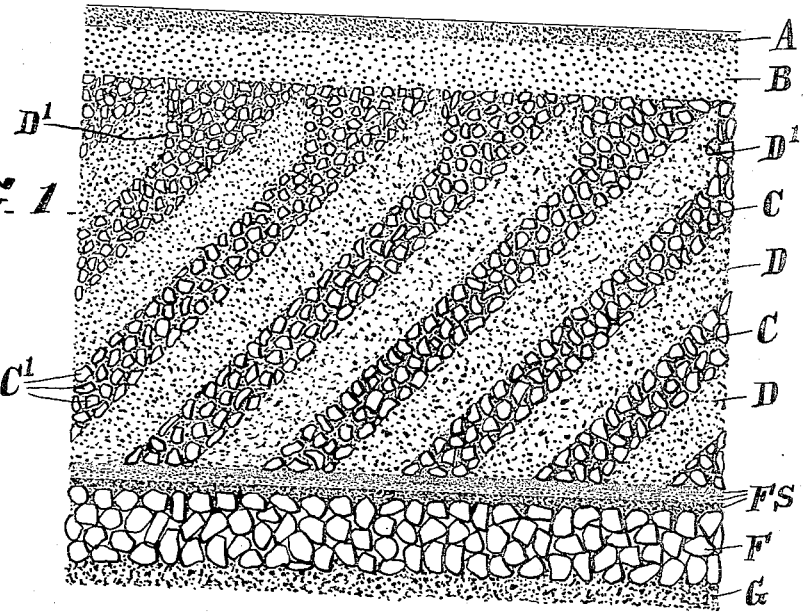
Figure 2:
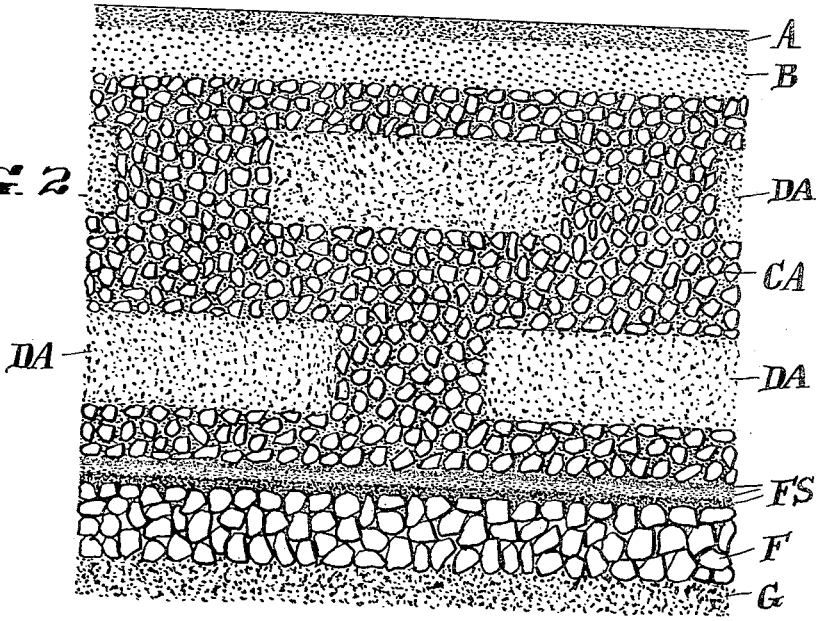

Of the drawings, Figure 1 is a sectional elevation of a portion of a bed constructed in accordance with one form of my present invention, and Fig. 2 is a view taken similarly to Fig. 1 illustrating a modified bed construction.

In the drawings and referring first to the construction shown in Fig. 1, the bed proper comprises a top soil stratum composed of the layers A and B which follow the contour of the surface of the bed, and a deep rooting subsoil stratum composed of bodies C and D, shown as alternate layers, inclined to the horizontal at an angle of about 45 degrees.

Where the underlying earth is of a gravelly nature, or is otherwise adapted to provide adequate drainage for the bed structure proper, the bodies C and D may rest directly on this underlying earth. Where the underlying earth is of a more or less impervious character, however, it may be necessary to make drainage provisions for the bed structure, and in Fig. 1, I have shown drainage provisions consisting of a layer F of broken stone resting directly upon the underlying earth G with a filter screen FS interposed between the broken stone layer F and the subsoil stratum of the bed proper. The filter screen FS may be composed of layers of sand and fine broken stone or pebbles of graduated fineness, and is employed to prevent the bed structure proper from washing down into the drainage layer F of broken rock.

In general, the top soil stratum is adapted to serve as a germinating layer for seeds deposited in it and to encourage quick and rapid growth of the fine newly grown roots issuing from the seeds and from the main root crowns, and to serve also as a sort of a mulch restricting the evaporation of water from the subsoil deep rooting stratum. The bodies C of the deep rooting stratum are constructed to make them readily penetrable by the growing roots and to insure the supply of air directly necessary for the root growth and necessary also to prevent any plant food and water holding material contained in the bodies C from souring or rotting, and to prevent objectionable sourness of the bodies D which are of such composition as to make the rich sources of plant food and to give them a large water absorbing and retaining capacity. The total percentage of void space per unit of volume in the bodies D need not differ materially from that in the bodies C but the individual voids in the bodies D are much smaller than in the bodies C.

To provide the proper character of void space in the bodies C, I preferably form these bodies in the construction shown in Fig. 1, with a skeleton or cellular framework composed of parts C' which I designate generically by the term "small stones", and which may be pebbles, broken brick or broken stone. The small stones C' may advantageously run from one quarter to three quarters of an inch in size or may be even larger. In general, the small stones C' should be tolerably uniform in size at the same levels throughout any one bed, but may advantageously be smaller at the top of the bed than at the bottom of the bed especially where the beds serve as putting greens. In such case the use of small stones larger than the one-quarter or three-eighth size near the top of the green is objectionable because they interfere with cutting out the putting hole, which, as is known to all golf players, must be frequently shifted from one part of the green to another during the playing season.

Where the bed is to serve as a putting green, there is an advantage in using round or roundish pebbles in the upper portions of the bodies or layers C, because of the greater ease with which the putting hole may be cut out. Advantageously the small stones C' or at least those employed in the lower portions of the bodies or layers C are of a porous water absorbing character, and for this reason I consider bricks of a porous character to be an advantageous material out of which to form the small stones, especially as they may be cheaply produced in many cases by passing the brick bat refuse of brick yards through a suitable crushing mill. The material which I consider most advantageous for this use, however, is a porous limestone found, for instance, near Sandusky, Ohio, which possesses substantially the same porosity as highly porous bricks, and in addition serves to give a desirable basisity to the soil. This porous limestone is a secondary formation formed from lime which has been held in solution.

Preferably I fill the void spaces between the bodies of small stones C' with a material which has a sponge-like water holding capacity and is adapted to supply some of the food required by the growing roots. The filling material which I consider most advantageous for this purpose is decayed vegetable matter, such as leaf mold, or "Jersey peat". This decayed vegetable matter may be enriched by the addition of material containing desirable root nourishing characteristics, such as cow manure. It may advantageously be mixed also, with a substance, such as I designate by the term "lifting sand", to add to the water holding capacity of the material partially filling the spaces between the small stones C', and when in the course of time the leaf mold is absorbed or used up by the plant life this lifting sand remains as a permanent dwelling place for the roots.

I prefer to use leaf mold which is well rotted, and for this reason I prefer to take the leaf mold, not from the very top of the forest soil but from layers slightly below the surface. This leaf mold is exceedingly sponge-like in its action, holding water to the extent of seventy per cent. of its own volume under some circumstances. Leaf mold of this character when exposed to the air may be kept wet or dry, or alternately wet and dry indefinitely without perceptible sourness or rotting, but soon rots when kept moist under conditions largely excluding air from it, although the same leaf mold may have been on the ground in the forest for a century or more.

By the term "lifting sand" I mean to include both natural and artificially formed granular compositions, of which certain fine sands are typical, having their void spaces of such fineness that a mass of the material possesses capillary properties effective to draw water many inches above the level of a pool or a body of water in contact with the base of the mass, and to hold water so absorbed indefinitely, except as it may lose it by evaporation or by contact with absorbing agents. In a prior application Serial No. 573,958, filed July 26, 1910, I have discussed the subject of lifting sands in some detail and have pointed out in particular that one very desirable lifting sand, which I designate as M. O. sand, is a substance consisting almost entirely of silica and having granular characteristics as set forth in the following table which gives the percentages of the M. O. sand and of another sand, hereinafter referred to, passing sieves of different mesh:

| Sieve meshes per inch. | Length of side of sieve openings in inches. | Philadelphia bar sand. | M. O. sand. |
| --- | --- | --- | --- |
| 5 | .16 | 100. | 98.6 |
| 12 | .0583 | 97.9 | 83.5 |
| 20 | .0335 | 96.0 | 78.0 |
| 40 | .0148 | 72.0 | 69.0 |
| 50 | .0110 | 42.5 | 65.5 |
| 100 | .0055 | 3.0 | 46.0 |
| 200 | .0030 | 1.0 | 23.5 |

It will be understood that the sieves referred to above are standard sieves in which the number of meshes per inch means the number of meshes per linear inch.

A column of the M. O. sand is capable of lifting water thirty-five inches or more above the surface of the body of water with which the base of the column is in contact. The high lifting capacity of this sand depends, I believe, upon the fact that a considerable portion of the sand is so fine that it may be called an impalpable powder.

The substance which I designate herein as "Jersey peat" is the substance known by that name to dealers in greenhouse and gardening material in and about Philadelphia, Pa. This substance is decayed vegetable matter which has not yet reached the completely powdered state and has not entirely lost its fibrous form, which is found at the top of the forest soil in New Jersey and in other localities. It lies from three inches to three feet deep below the surface of the ground. Throughout this product there still remains old stems, twigs, branches, roots and limbs, which have not entirely lost their form and still have some woody fiber left in them, and in addition the roots of growing vegetation. This substance is much like the leaf mold referred to above both with respect to its water holding capacity and its liability to rot when kept moist and compressed so as to be very dense or otherwise subjected to air excluding conditions.

One concrete example of a composition which I consider desirable for the layers or bodies C is the following: five parts of small stones mixed with four parts of a mixture consisting of two parts of Jersey peat, one part of M. O. sand, and one part of cow manure, which, in all compositions of this character, should be well rotted. In forming the above mentioned composition and others hereinafter referred to, volume measurements are employed and the different constituents are measured dry. The Jersey peat should be chopped up, as by running it through a feed cutter, so that there will be no pieces of roots longer than about one-half inch, and the cow manure should also be thoroughly broken up.

Another composition for the bodies C which has given excellent results in practice is formed by mixing with five parts of small stones, three parts of Jersey peat ground fine and from which all stems, roots and fibrous matter have been eliminated by screening.

The void space in a mass of stones runs from about 37 per cent. with round smooth pebbles up to about 55 per cent. of the total apparent volume of the mass in the case of jagged broken stones. When the water absorbing plant food nourishing material is mixed with the small stones, as specified above, to form the bodies C, the stones proper occupy a still smaller proportion of the total space apparently occupied by the stones and the material mixed therewith. The presence of the small stones C' in the bodies C thus insure the presence of void spaces through which the growing roots readily pass and which contain adequate supplies of air. The use of small stones in the bodies C is not essential, however, to give these bodies the necessary root penetrability, and to insure proper air supplies for the growing roots. Certain coarse grained soils possess the desired penetrability and contain sufficient air in the voids between the soil grains to encourage the growth of roots. Moreover, the growing roots as they push their way through such a soil, make channels or passages which materially aid in supplying the desired sufficiency of air. The Jersey peat also, when simply chopped up forms a material which may be used without admixture of any other material to serve as a filler between the bodies D since, this Jersey peat is easily penetrable by the growing roots and contains a sufficient supply of air for the growing roots, the presence of the twigs, limbs, and roots contributing materially to the open character of this material.

Various compositions may be used to form the bodies D which are intended to have a large water holding capacity and to form rich sources of plant food, and because of these characteristics, and also because the void spaces therein are small, are not penetrated readily in rapidly growing roots, although suckers from the roots growing in the bodies C draw large quantities of food as well as moisture from the adjacent bodies D. One composition for the bodies D which I have employed with excellent results consists of a mixture of about equal parts of the M. O. sand and dry cow manure. Instead of combining these constituents in equal proportions, two or three parts of M. O. sand to one part of cow manure may be employed with good results. In lieu of the M. O. sand, I may also, and I believe preferably, employ certain heavy clays of fine texture which have very substantial water absorbing and retaining properties, one, two or three parts of the clay being mixed with dry cow manure or equivalent plant nourishing food.

The arrangement of the bodies C and D in inclined layers, as shown in Fig. 1, is advantageous in that it facilitates the construction of the bed, and is advantageous also in that when the bed is watered, either naturally or artificially, the water passing down through the top soil layers A and B is to a large extent intercepted by the water absorbing bodies D. The water which enters the portions of the bodies C between the upper ends of an adjacent pair of bodies D and not absorbed by the material partially filling the voids between the small stones C' passes almost directly down and a large portion of it passes into contact with the upper side of the underlying body D. In order to encourage the roots to grow down into the bodies C I prefer to bevel off the edge of the bodies D along the lines D' D', as shown in Fig. 1, and to correspondingly enlarge the upper edges of the bodies C.

The materials forming the bodies C and D are thoroughly mixed and are then moistened sufficiently to make them quite readily plastic before the bodies are formed and put in place. The angle at which the bodies C and D are inclined to the horizontal in the construction shown in Fig. 1 enables each body when put in place to retain its shape during the time required to put the adjacent and overlying body in place, and of course each of these bodies when put in place tends to preserve the form of the portion of the bed already constructed. While the bodies C and D may be formed *in situ* in a manner analogous to that in which mortar is put in place, I consider it advantageous to form these bodies in trough-like molds of convenient lengths and to discharge the molded bodies from the molds directly into place. The bodies C and D may be of any convenient length, ordinarily they extend clear across the bed of which they form a part. The depth of the subsoil stratum depends upon conditions. For growing grass for putting greens I regard twelve inches as a satisfactory depth. The bodies C and D may vary in thickness ordinarily from one to five inches. For growing grass I prefer to have them each about one inch thick.

A wide range of materials and compositions may be employed in the top soil layers A and B in order to enable this stratum to perform its double function of serving as a mulch to restrict the evaporation of moisture from the subsoil stratum, and of germinating seeds deposited in it and of encouraging a vigorous growth of roots therein. One example of a suitable composition for the layer B is two parts of Jersey peat shredded one, one part of cow manure and one part of moisture holding sand such as the M. O. sand. For growing grass the layer B may be about one inch thick.

The layer A is the germinating layer proper and its character and thickness depends somewhat upon the conditions which the bed is intended to meet. In growing red fescue frass for instance, I have had excellent results by making this layer about three-quarters of an inch thick and of a composition consisting of one part of red fescue grass seed and about eight parts of germinating material, which in this case is composed of one part of leaf mold or Jersey peat or equivalent substance and one or more parts of a sand such as that which I call "Philadelphia bar sand". The granular characteristics of this sand have already been given herein. This sand is not what I call a high lifting sand and its water absorbing and holding properties are indicated by the fact that it will lift water only from five to seven inches.

The germinating material after being thoroughly mixed and properly moistened may be put in place by the use of a trowel or like device. I use such a sand as "Philadelphia bar sand" in combination with leaf mold as germinating material to give a desirable porosity to the germinating layer and because of the fact that with this composition the seeds germinate, and the blades of grass find their way to the surface about equally well whether the germinating layer is left loose or is packed, as by being walked upon.

The germinating layer, as I have already indicated, should vary with the character of the seeds, for instance, with very fine grass seeds this layer may be only three-sixteenths of an inch thick. In place of leaf mold, I may employ, of course, "Jersey peat" and other suitable materials in the germinating layer.

A highly desirable substitute in the top soil for the leaf mold or Jersey peat, is the material obtainable in the Netherlands and known as "peat moss." This substance, when used in the germinating layer A, is preferably ground or shredded to such a fineness that it will pass a sieve having 14 meshes to the inch, and I mix from four to eight parts of the shredded mixture with one part of seeds to form the germinating layer. When using this material in the layer B I shred it or grind it so that it will pass a sieve of from 8 to 14 meshes to the inch, and mix two parts of peat moss with about one part of cow manure.

No claim is made herein on germinating or blanket layers characterized by the presence of peat moss as this subject matter is fully disclosed and claimed in my copending application, Serial No. 49653, filed September 9, 1915.

Certain general principles utilized in the construction of the beds disclosed herein are explained in my prior application, Serial No. 573,958, referred to above, and are utilized in the invention claimed therein. The arrangement disclosed herein, however, in which a deep rooting subsoil stratum is formed with segregated bodies of water absorbing and rich plant food containing bodies which are spaced apart by the more open root penetrable soil, constitutes an important practical improvement over the apparatus disclosed in my prior application. While the beds disclosed herein are particularly useful for growing fine grasses such as are desirable for putting greens, they form effective devices for growing vegetation of a very different character. For instance, they may be excellent beds in which to grow roses.

In growing vegetation such as roses, the depth of the subsoil stratum should ordinarily be greater than is required for growing grasses, and the distances between adjacent dense water holding and rich food containing bodies as well as the dimensions of said bodies may be advantageously made considerably greater than in growing grass.

While I consider the inclined layer arrangement of the open root containing material and the dense water holding and food containing material shown in Fig. 1 to be especially advantageous, it will be apparent to those skilled in the art that other arrangements of these materials may be made without departing from the broad principles of the present invention. One alternative arrangement in this respect is shown in Fig. 2, wherein the parts A, B, FS and F are arranged as in Fig. 1, but in Fig. 2 the deep rooting subsoil stratum may be regarded as consisting of a layer of material CA which may be identical with that employed in the bodies C of Fig. 1, and which has interspersed throughout it layers or bodies DA which may be identical in composition with the bodies D of Fig. 1. The bodies DA are arranged, as shown in Fig. 2, like bricks in brickwork in which the bricks break joints but are separated by wide gaps, the material CA corresponding in this view of the bed of Fig. 2 to the mortar of the brickwork.

By the regular arrangement of component parts of the root growing beds characterizing the construction described and illustrated there is secured a uniformity in the growth and character of the vegetation grown on the beds not otherwise obtainable.

While in accordance with the provisions of the statutes I have illustrated and described the best forms of my invention now known to me, it will be apparent to those skilled in the art that changes may be made in the form of the apparatus disclosed without departing from the spirit of my invention, and that under some conditions certain features of my invention may be used with advantage without a corresponding use of other features.

Having now described my invention what I claim as new and desire to secure by Letters Patent is:

1. In a root growing bed the combination with bodies of material having a large water absorbing and holding capacity and containing root food, of material readily penetrable by growing roots which spaces said bodies apart and has a considerable air containing void space.

2. In a root growing bed the combination with bodies of material having a large water absorbing and holding capacity and containing root food, of intervening bodies spacing the first mentioned bodies apart and formed of material readily penetrable by growing roots, and having a considerable air containing void space.

3. In a root growing bed the combination with bodies of material having a large water absorbing and holding capacity and containing root food, of material readily penetrable by growing roots which spaces said bodies apart and has a considerable air containing void space, said bodies overlapping one another so as to intercept substantially all water tending to pass downward through the bed.

4. In a root growing bed the combination with a regularly disposed series of bodies of material having a large water absorbing and holding capacity and containing root food, of material readily penetrable by growing roots which spaces said bodies apart and has a considerable air containing void space.

5. In a root growing bed the combination with bodies of material having a large water absorbing and holding capacity and containing root food, of intervening bodies spacing the first mentioned bodies apart and formed of material readily penetrable by growing roots and having a considerable air containing void space, said bodies being inclined to the horizontal and overlapping one another.

6. In a root growing bed the combination with bodies of material having a large water absorbing and holding capacity and containing root food, of intervening bodies spacing the first mentioned bodies apart and formed of material readily penetrable by growing roots and having a considerable air containing void space, said intervening bodies being expanded at their upper edges and the first mentioned bodies being correspondingly narrowed at their upper edges.

7. In a root growing bed the combination with a deep rooting subsoil consisting of bodies of material having a large water absorbing and holding capacity and containing root food, and material readily penetrable by growing roots, which spaces said bodies apart and has a considerable air containing void space, and a top soil serving as a mulch restricting evaporation from the subsoil.

8. In a root growing bed the combination with bodies of material having a large water absorbing and holding capacity and containing root food, of intervening bodies spacing the first mentioned bodies apart and formed of material readily penetrable by growing roots and having a considerable air containing void space, said first mentioned bodies being composed of a mixture of a fine granular substance of a non-nutritive character with a rich root food.

9. In a root growing bed the combination with bodies of material having a large water absorbing and holding capacity and containing root food, of intervening bodies, spacing the first mentioned bodies apart, of material readily penetrable by growing roots and having a considerable air containing void space, said first mentioned bodies being composed of a mixture of fine clay with a rich root food.

10. In a root growing bed the combination with bodies of material having a large water absorbing and holding capacity and containing root food, of intervening bodies, spacing the first mentioned bodies apart, of material readily penetrable by growing roots and having a considerable air containing void space, said first mentioned bodies being composed of fine clay mixed with cow manure.

11. In a root growing bed in combination with bodies of material having a large water absorbing and holding capacity and containing root food, of intervening material spacing said bodies apart and comprising a cellular framework formed by small stones, the void spaces of said framework containing air and being adapted to receive growing roots.

12. In a root growing bed in combination with bodies of material having a large water absorbing and holding capacity and containing root food, of intervening material spacing said bodies apart and comprising a cellular framework formed by porous small stones, said framework containing air and being adapted to receive growing roots.

13. In a root growing bed the combination with bodies of material having a large water absorbing and holding capacity and containing root food, of intervening material spacing said bodies apart and comprising a cellular framework formed of small stones of a composition adapted to give basisity to the soil, said framework containing air and being adapted to receive growing roots.

14. In a root growing bed the combination with bodies of material having a large water absorbing and holding capacity and containing root food, of intervening material spacing said bodies apart and comprising a cellular framework formed of small bodies of porous limestone, the void spaces of said framework containing air and being adapted to receive growing roots.

15. In a root growing bed comprising in combination an underlying drainage layer of broken rock, a deep rooting subsoil comprising alternate layers composed of a mixture of dense clay with a root food material and intermediate layers of small stones with void spaces therein partially filled with a water absorbing and plant food nourishing material, said layers being inclined to the horizontal and overlapping one another, and a top soil stratum adapted to serve as a mulch restricting evaporation from the subsoil stratum and to encourage the germination of seeds and the propagation of new roots.

FREDERICK W. TAYLOR.

Witnesses:
ARNOLD KATZ,
JOSEPH R. BOUCOT.